United States Patent [19]

Champalaune et al.

[11] Patent Number: 4,995,803
[45] Date of Patent: Feb. 26, 1991

[54] APPARATUS FOR CONTINUOUSLY PRODUCING SUBSTANTIALLY PARALLELEPIPEDAL PIECES OF MEAT

[75] Inventors: Jean-Claude Champalaune, Merdrignac; Yvon Corveler, Pontivy; André Coutard, Villers Bocage, all of France

[73] Assignee: Kaufler S. A., Loudeac, France

[21] Appl. No.: 406,014

[22] Filed: Sep. 12, 1989

[30] Foreign Application Priority Data

Sep. 13, 1988 [FR] France .................. 88 12070

[51] Int. Cl.⁵ .............. B29C 47/08; A23L 1/317; A23P 1/12
[52] U.S. Cl. ................. 425/190; 264/146; 264/148; 425/294; 425/301; 425/309; 425/311; 425/313; 425/380; 425/382.3; 425/461
[58] Field of Search .............. 425/190, 294, 301, 306, 425/307, 308, 309, 311, 313, 380, 382.3, 382.4, 461, 464; 264/146–148, 157, 160, 177.11, 211.11

[56] References Cited

U.S. PATENT DOCUMENTS

| | | | |
|---|---|---|---|
| 2,085,108 | 1/1937 | Louisot et al. | 99/107 |
| 2,539,232 | 1/1951 | Dempster | 146/131 |
| 3,502,127 | 3/1970 | Nathanson et al. | 146/73 |
| 3,527,859 | 9/1970 | Fairbanks | 264/146 |
| 3,784,533 | 1/1974 | Mach | 264/146 |
| 3,934,050 | 1/1976 | Hawkins | 426/645 |
| 3,991,440 | 11/1976 | Hendrickson | 425/246 |
| 4,060,998 | 12/1977 | Bernard | 62/320 |
| 4,515,738 | 5/1985 | Anders | 425/190 |
| 4,614,489 | 9/1986 | Juravic | 425/464 |
| 4,731,006 | 3/1988 | Freda et al. | 425/308 |
| 4,868,002 | 9/1989 | Scaglione et al. | 425/308 |

FOREIGN PATENT DOCUMENTS

| | | |
|---|---|---|
| 639210 | 11/1936 | Fed. Rep. of Germany . |
| 3202748 | 8/1983 | Fed. Rep. of Germany . |
| 323033 | 2/1903 | France . |
| 2238437 | 2/1975 | France . |

Primary Examiner—James C. Housel
Attorney, Agent, or Firm—Pollock, Vande Sande & Priddy

[57] ABSTRACT

An apparatus for continuously producing substantially parallelepipedal pieces of meat (M) from blocks of meat (B) of larger size, including an Archimedes' screw-type supply unit (2) and, in the direction of travel of the blocks, a shaping device (4) which has a substantially circular entrance (400) and an exit (412) of elongated rectangular section, longitudinal cutting disks (5) and transverse cutting guillotine blade (6), the longitudinal cut being made during passage of the blocks of meat (B) inside the shaping device.

5 Claims, 4 Drawing Sheets

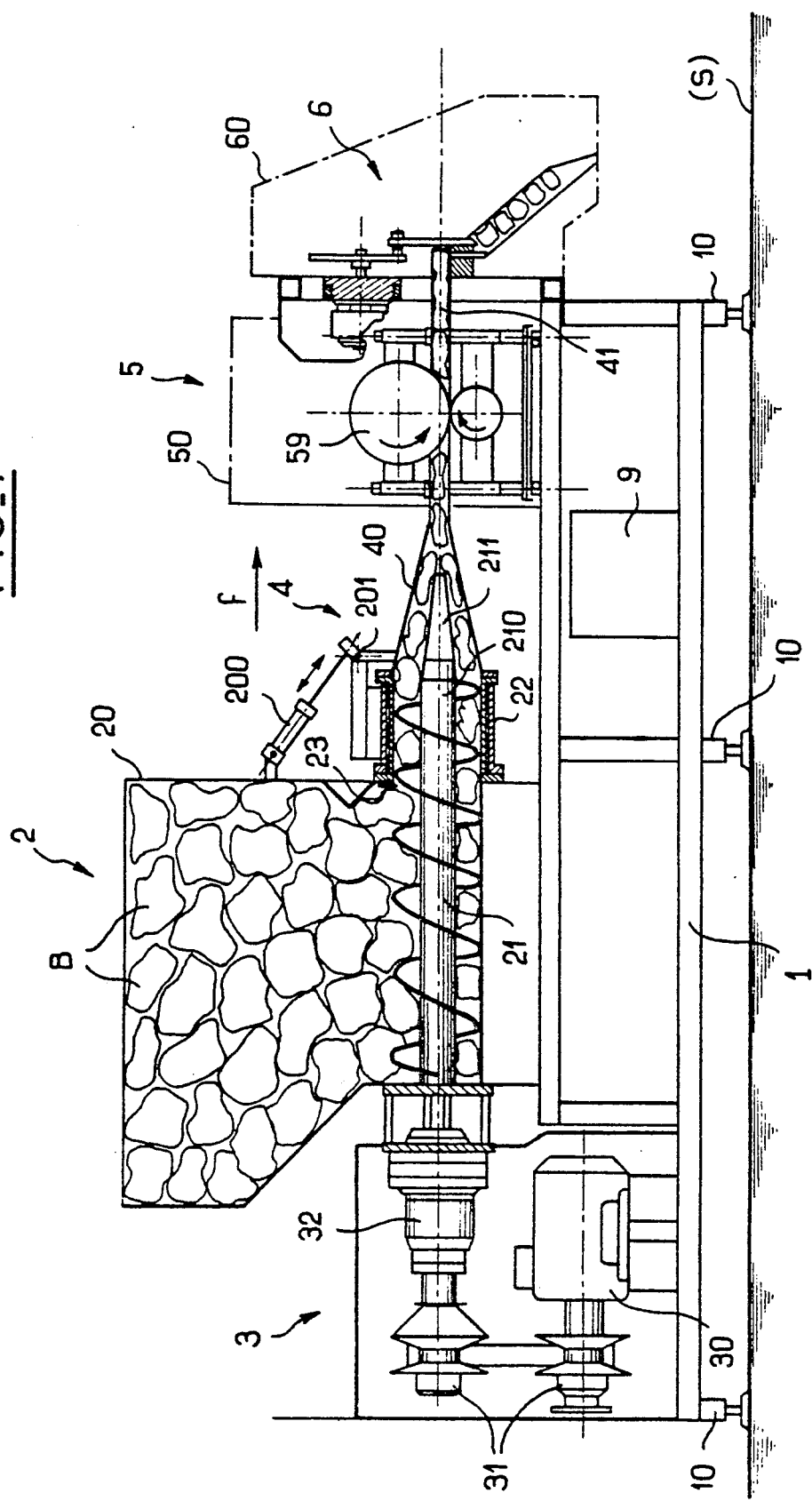
FIG_1

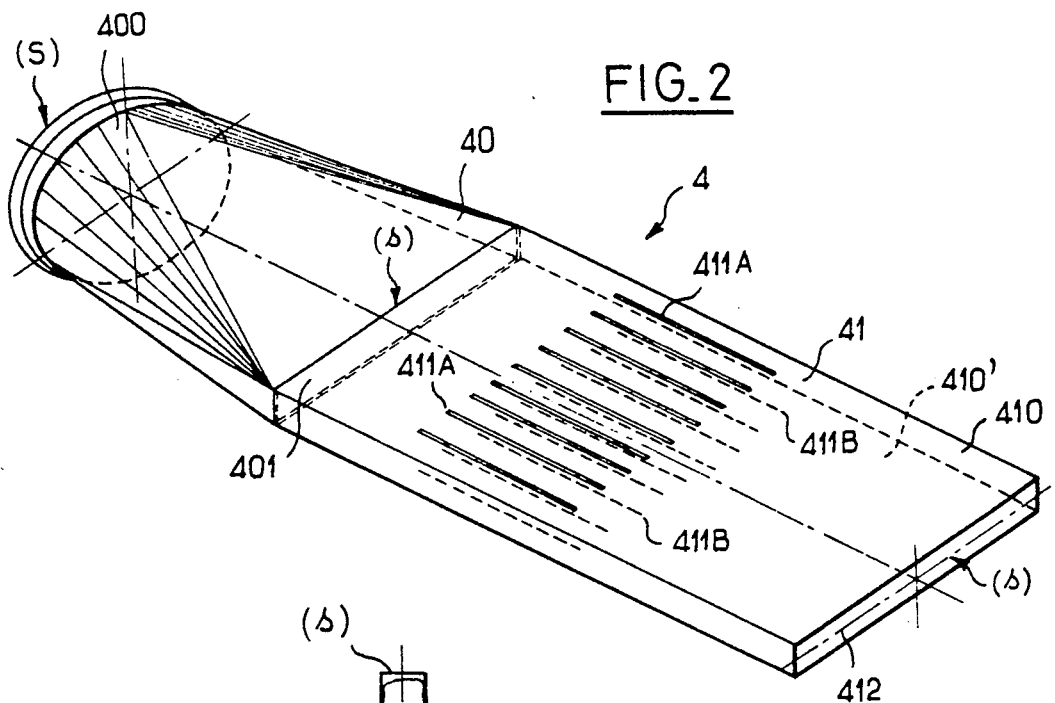
FIG_2
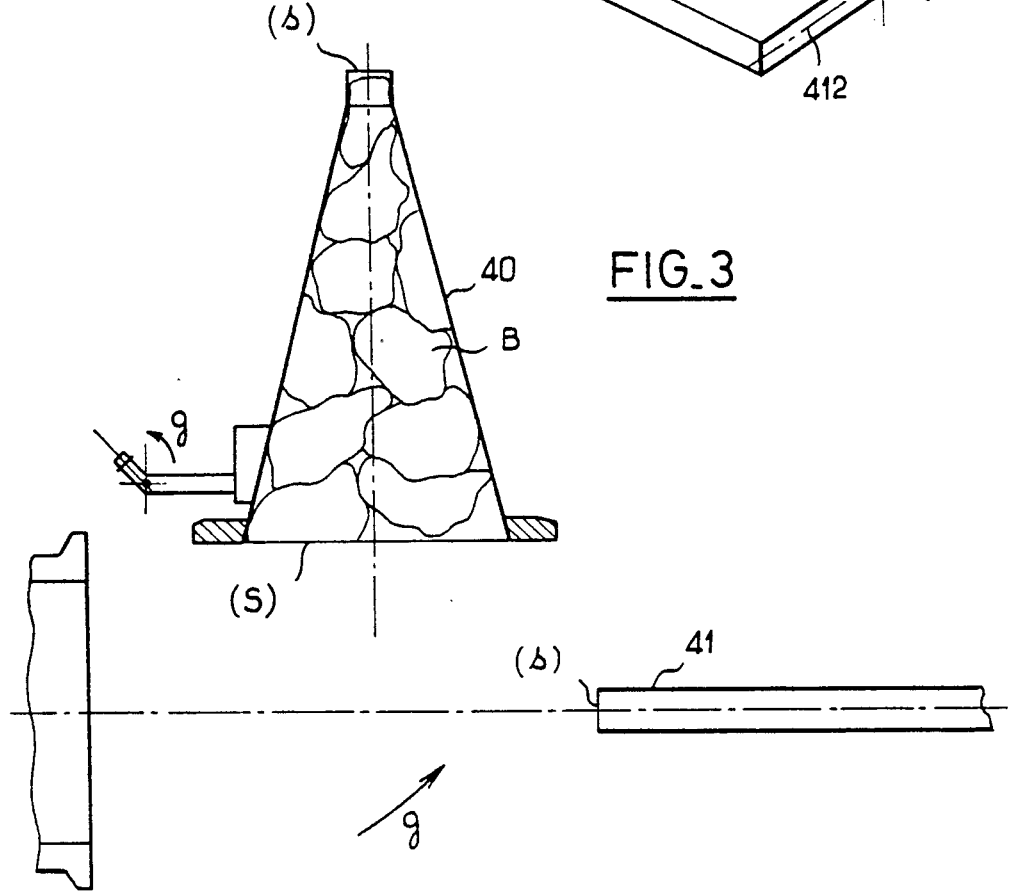
FIG_3

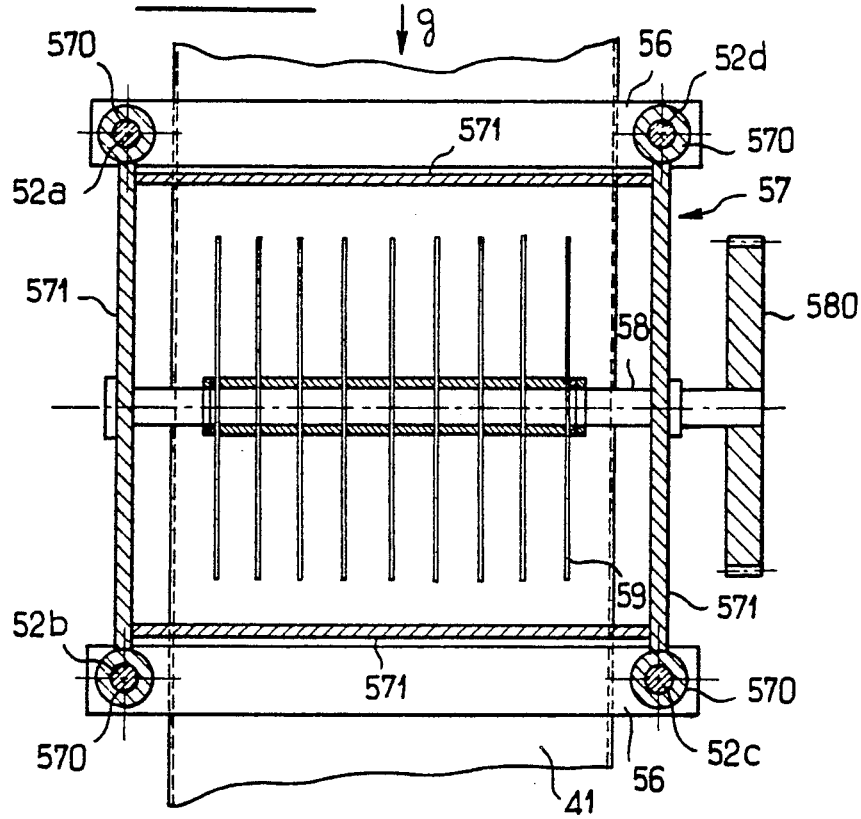
FIG_4A
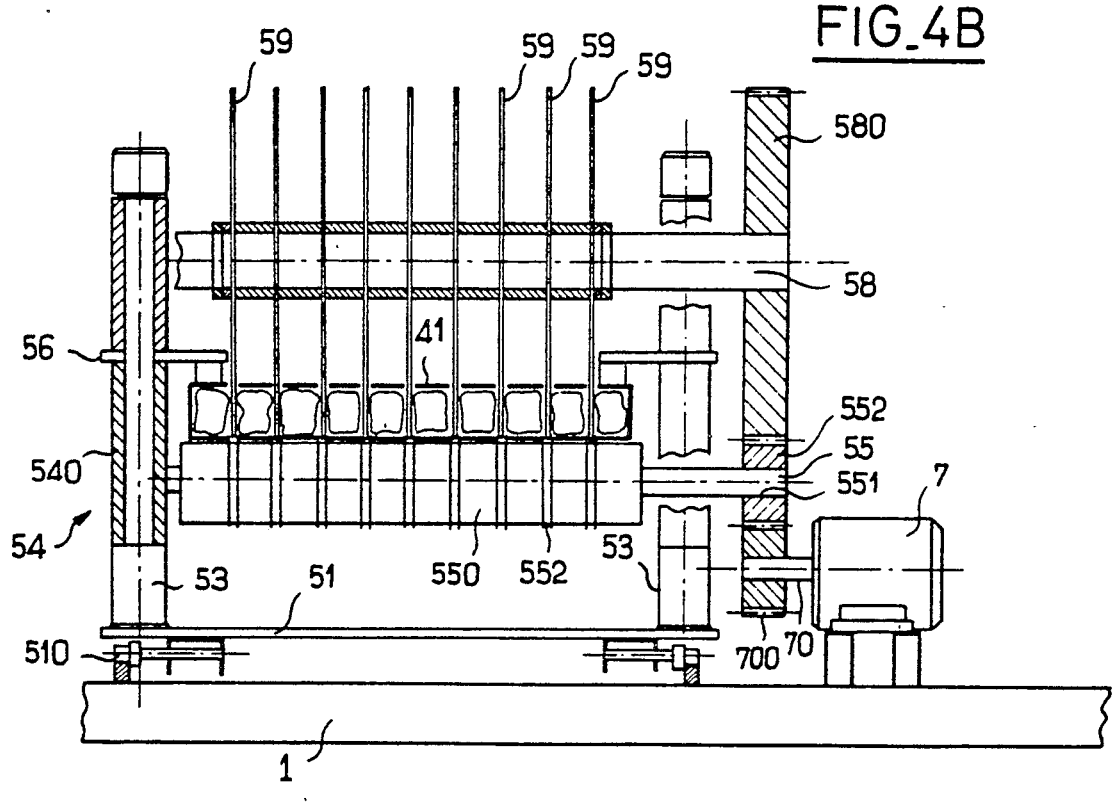
FIG_4B

APPARATUS FOR CONTINUOUSLY PRODUCING SUBSTANTIALLY PARALLELEPIPEDAL PIECES OF MEAT

FIELD OF THE INVENTION

The present invention relates to a device for continuously producing substantially parallelepipedal pieces of meat from blocks of meat of larger dimensions, and is particularly applicable to the production of beef or pork.

BACKGROUND OF THE INVENTION

The meat product market has, in recent years, seen a substantial increase in the consumption of products which have been converted into individual portions, such as minced or breadcrumbed meats. In parallel, the consumption of traditional means (steak, whole chicken) has decreased. The consumer, in fact, seeks foods of constant quality.

Another development in the meat industry is that intermediate products are more and more often supplied to the manufacturer, who prepares the final product intended for sale. These intermediate products—or "ore"—are in fact small pieces of meat. The manufacturer can then measure out, as advantageously as possible, the various constituents in its preparation (fat, lean, etc.) in order to obtain a final product of constant quality. This development is more particularly applicable in the sector of breadcrumbed or minced meats as well as in that of cooked or dry pork-butchery.

Of course, this ore must have precise characteristics:
  the nature of the meat must be easily identifiable;
  the structure of the muscle fibers must remain intact;
  the meat must have undergone little pressure likely to extrude the fats and the water outside the muscle mass, thereby promoting the formation of emulsions; it is important to avoid these emulsions since they are both undesirable for the subsequent manufacture of certain final products and responsible for a phenomenon of coating of the lean meat which can hamper optical analysis of the composition of the ore (determination of fat/lean ratio);
  the pieces must have a uniform shape;
  the meat must have a minimum of pieces of small size (fines) which promote the emulsion.

Devices making it possible to obtain this ore and, consequently, capable of cutting the meat three-dimensionally have already been proposed.

Thus, a device is know in which the meat is extruded in strips through a grid, a transversely rotating knife being located behind this grid. Unfortunately, this type of device is unsuitable for obtaining an ore possessing the characteristics described above. In fact, the meat undergoes very great pressure as it passes through the grid. Consequently, the meat is denatured and the emulsion rate is very high.

Moreover, know machines do not make it possible to continuously supply the device for cutting up meats.

SUMMARY OF THE INVENTION

An object of the present invention is to provide a device which makes it possible to continuously produce substantially parallelepipedal pieces of meat from blocks of meat of larger dimensions, these pieces having retained their fibrous structure and having undergone few pressure stresses. The pieces obtained will be of uniform size and will include few fines (pieces of small size). Further objects of the invention are to provide a device making it possible to process rapidly and continuously a large mass of blocks of meat, and to enable the processing of frozen meat or fresh flesh.

These objects are achieved in that the device of the invention comprises an Archimedes' screw-type unit for supplying blocks of meat and, in the direction of travel of the blocks, a shaping device which has a substantially circular entrance and an exit of elongated rectangular section, longitudinal cutting means and transverse cutting means, the longitudinal cut being made during the passage of the blocks inside the shaping device.

According to other particularly advantageous, but optional, characteristics:
  the shaping device consists of two parts which may be interchangeable, namely
  a part in the form of a funnel having an entrance of substantially circular section and an exit of elongated rectangular section, and
  an extrusion device of parallelepipedal form, whose section is substantially identical to that of the exit of the part in the form of a funnel;
  the large faces of the extrusion device have longitudinal slots disposed opposite one another in pairs, intended to receive the cutting members of the longitudinal cutting means;
  said longitudinal cutting means consist of rotating disks which interact with a cylinder of movable counter-blades;
  the transverse cutting means are disposed at the exit of the shaping device;
  the transverse cutting means consist of a guillotine blade;
  the part in the form of a funnel is pivotably mounted, and a dual-effect jack is provided, which is capable of pivoting the funnel upwards through an angle of approximately 90°, which makes it possible to remove from the latter the blocks of meat which have not been cut up (residue from the operation).

BRIEF DESCRIPTION OF THE DRAWINGS

Other characteristics and advantages of the present invention will emerge on reading the detailed description of an embodiment of the device with reference to the appended drawings, in which:

FIG. 1 is a schematic side view of the device according to the invention;

FIG. 2 is a simplified view, in perspective, of the shaping device;

FIG. 3 is a side view of the shaping device of FIG. 2, the part in the form of a funnel having undergone a pivoting movement of 90°;

FIGS. 4A and 4B are top plan and front elevation views, respectively, of the longitudinal cutting means; from above and from the front respectively;

DESCRIPTION OF PREFERRED EMBODIMENT

Figure 5A:
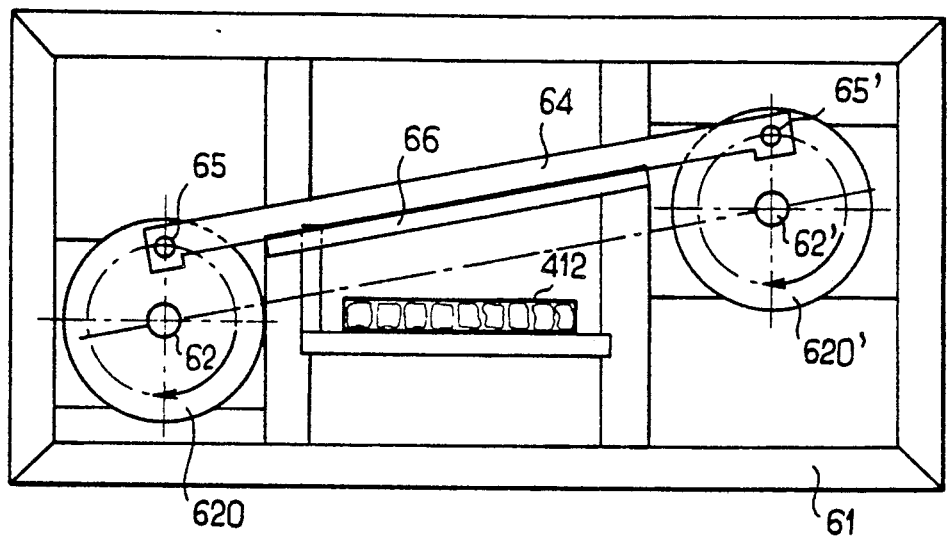
FIGS. 5A and 5B are front and side elevation views, respectively, of transverse cutting means from the front and from the side respectively.

The device shown in FIG. 1 comprises a frame 1 whose legs 10 rest on the ground (S). A unit 2 for supplying blocks of meat is mounted on this frame. This unit 2 comprises and Archimedes' screw which is driven in rotation by a drive unit 3. Also mounted on the frame are a shaping device 4, longitudinal cutting means 5 and transverse cutting means 6. These various elements will be described in detail hereinafter. The general direction of the meat in the device is shown by the arrow (f).

The unit for supplying blocks of meat comprises a storage hopper 20. The phrase "blocks of meat" is understood to mean muscular masses of relatively large size and mass which have been previously cut up or left whole. These are entire anatomical parts, for example necks of beef, whose average mass is of the order of 25 kg. The hopper is sufficiently large to receive a large number of blocks of meat (B). At the bottom of the hopper is disposed an Archimedes' screw 21, with a substantially horizontal axis, whose function is to gradually supply the blocks to the shaping device 4. The downstream part 210 of the latter is guided in rotation in a ring 22 in order not to interfere, in any case, with the travel of the blocks of meat. If the screw were guided, in a conventional manner, in a bearing, this would in fact constitute an obstacle interfering with this travel and causing undesirable pressure stresses on the blocks. The inner surface of the ring 22 is preferably grooved in order to prevent the blocks driven by the from rotating without longitudinal movement. The screw is driven in rotation by a motor 30, via a variable-speed drive unit 31 and a reduction gear 32. The motor is, for example, of the electric type. The downstream end 211 of the screw is frusto-conical, with a relatively small angle of conicity. It should be noted that this end 211 is located outside the ring 22, inside the shaping device 4. The function of the frusto-conical shape of the downstream end 211 of the screw is to maintain the passage section of the meats substantially constant or, in other words, to avoid, as far as possible, sudden changes in section (as would be the case inside the shaping device with a conventional screw having a cylindrical end) which would cause a rapid expansion of the blocks of meat.

At the entrance of the ring 22, at the top of the latter, is disposed a blade 23 with a cutting edge whose function is to interact with the thread of the Archimedes' screw 21 in order to perform a partial precutting up of the blocks; this is a coarse preliminary separation which helps the travel of the meats via the screw towards the shaping device, certain large blocks being sectioned into two (or more) pieces.

The shaping device 4 consists of two interchangeable parts 40 and 41 (FIG. 2). The part 40 which has a general funnel shape comprises an entrance 400 of substantially circular section which fits onto the ring 22 described above. The exit 401 of this part has a section (s) of elongated rectangular form. According to a particular embodiment of the invention, the section (S) of the entrance 400 is three times as large as the section (s).

The part, or extrusion device, 41 has, for its part, a parallelepipedal form and has a transverse section which is substantially identical to the section (s) of the exit 401 of the part 40. Appropriate means (not shown in FIG. 2) make it possible to ensure a leakproof link between the parts 40 and 41. The large faces 410 and 410' of the extrusion device 41 each have a series of longitudinal grooves 411A, 411B. The grooves 411A and 411B are disposed opposite one another in pairs. The function of these grooves will be explained hereinafter. On examining FIG. 2, it will easily be understood that the blocks of meat (B) conveyed by the Archimedes' screw 21 to the entrance 400 of the shaping device are gradually pushed inside the latter and shaped (by flattening) in order finally to assume the section (s).

According to an essential characteristic of the invention, the device comprises longitudinal cutting means 5 which are disposed at the level of the shaping device and, more precisely, of the extrusion device. These means are contained in a housing 50 carried by the frame 1. The extrusion device 41 passes through this housing on either side such that the grooves 411A, 411B are located inside the latter.

The longitudinal cutting means are more particularly illustrated in FIGS. 4A and 4B. The direction of travel of the meat has been shown by means of the arrow (g). A support plate 51 is mounted on rollers, or small wheels, 510 guided on longitudinal rails. At each of its corners, this plate supports vertical columns 52a, 52b, 52c, 52d. Cylindrical spacers 53 are slipped over each of these columns. A frame 54 is placed on the cylindrical spacers 53, which frame comprises, at its corners, tubes 540 connected in pairs by plates which are not visible. Two of these plates, parallel to one another, each have a hole with a shaft 55 passing through it. A cylinder 550 of counter-blades is mounted on this shaft. The free end 551 of the shaft 55 is equipped with a pinion (toothed wheel) 552. Support members 56 for the extrusion device 41 are also slipped over the columns 52a to 52d. Finally, a frame 57 with a form similar to the frame 54 completes the stacking on the columns. The tubes 570 and plates 571 of this frame are visible in FIG. 4A. This frame 57 supports a shaft 58 equipped with cutting disks 59. The number of disks and their spacing is such that each of the latter coincide with a pair of grooves 411A, 411B of the extrusion device and with one of the grooves 55 of the counter-blade cylinder 550. The shaft 58 is also equipped at one of its ends with a pinion 580. It will be noted in FIG. 4B that the pinions 552 and 580 engage with one another, forming a gear. The pinion 552 is driven by a pinion 700 integrally attached to the output shaft 70 of an electric motor 7. Starting-up of the motor thus causes the joint rotation of the cutting disks 59 and of the counter-blade cylinder 550. It should be noted that this arrangement of elements which can interact with one another is particularly practical insofar as it makes it possible to clean or change either of the elements without complex handling and decoupling, by means of simple unstacking. It is advantageous to provide several sets of longitudinal cutting tools which can be interchanged (disk unit/counter-blade cylinder) and have varying cutting widths, each associated with an extrusion device having corresponding slots, so that it is possible to modify the width of the strips obtained; it is for this reason that the ease of removing these tools is an advantageous characteristic of the device.

The blocks of meat, which are gradually conveyed inside the shaping device and are shaped by the latter, arrive at the level of the longitudinal cutting means where they undergo a longitudinal cutting which cuts them up into strips. This cutting is performed in a completely uniform manner since the blocks of flesh are contiguous with one another in the shaping device. There is thus no incorrect cutting.

Figure 5B:
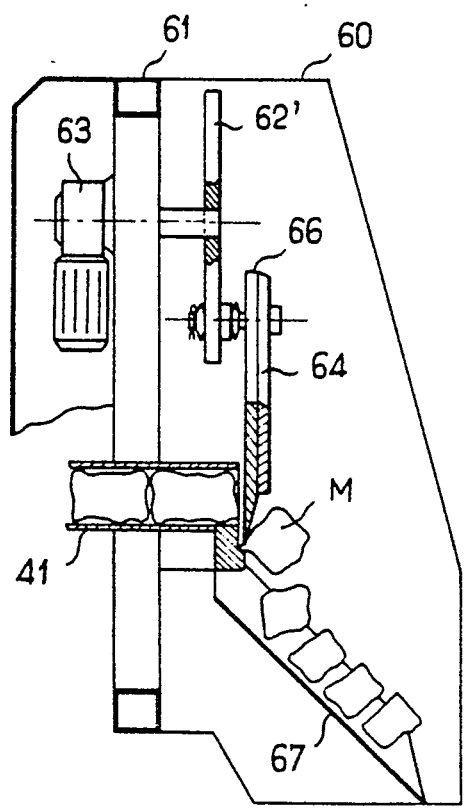

The device of the invention also comprises transverse cutting means 6 protected by a cowling 60. These means are disposed right at the exit 412 of the extrusion device 41 and perpendicularly to the latter. They comprise a frame 61 which supports two longitudinal axles 62, 62' carrying identical rotating disks 620, 620'. One of the axles 62 is driven in rotation by a motor 63 integrally attached to the frame 61. A chain transmission (not shown) between the axles 62, 52' ensures the synchronization of the two disks 620, 620' which must rotate at the same speed. In an alternative embodiment, two synchronized motors could be provided, each ensuring the positive drive of these disks. A rod 64 is articulated at is ends to each of the disks 620, 620' by means of an axle 65, 65'. The lower edge of the rod 64 is equipped with a guillotine blade 66 which has a cutting edge. It will easily be understood, by examining FIGS. 5A and 5B, that starting-up of the motor 63 causes the blade 66 to oscillate downwards and upwards, with a slanting component. In this manner, as the strips of meat, which have previously been cut up by the longitudinal cutting means, arrive at the exit of the extrusion device, the latter undergo a transverse cutting which converts them into substantially parallelepipedal pieces (M), or even into thin slices (few millimeters thick, for example). This is a clean and uniform cut rendered possible by the fact that the strips of flesh, at the exit of the extrusion device, are still shaped and contiguous. The "slanting" cut avoids shock, the blade progressively encountering the different strips. After cutting, the pieces of meat fall, due to gravity, along a chute 67 into a suitable receptacle (not shown).

Obviously, the transverse cutting blade 66 must be driven at a relatively high speed in order not to interfere with the advance of the material in the device, which advance takes place continuously in the extrusion device.

When the machine is stopped, it is desirable to remove from the device, essentially with a view to cleaning the latter, the blocks of meat which are still in the vicinity of the Archimedes' screw and in the shaping device.

In order to be able to have access to the shaping device and to the screw, still for reasons of cleaning, the longitudinal and transverse cutting means may be moved relative to the frame. To this end, the transverse cutting means (6) are articulated on the frame about a vertical axis, on one side (in the manner of a door). By pivoting them outwards, a space is created which is sufficient to permit the movement of the longitudinal cutting means (5), by means of the small wheels 510 (along the guide rails) after detaching the two elements 40 and 41 of the shaping device. The part 40 of the shaping device is mounted so as to tilt about a transverse horizontal axle 201. The tilting of this part is controlled by a dual-effect jack 200. The positive movement of the rod of this jack (retraction into the body of the jack) causes the part 40 to pivot in a circular movement upwards (arrow g, FIG. 3). The movement is approximately 90° relative to the position occupied by the part 40 during use. In this position (see, in particular, FIG. 3), access is gained very easily to the blocks of flesh located inside the shaping device. A container 9 placed at the bottom of the frame 1 makes it possible to recover these blocks with a view to their re-use.

Means are also provided for freeing the space occupied in a position of use by the cutting means 5 and 6, for example by pivoting through 90°. When the part 40 of the shaping device is in a raised position, it is than possible to slide the Archimedes' screw out of the device after detaching its shaft from its drive bearing. It is thus possible to remove manually the blocks of meat trapped between the threads of the screw as well as those which have fallen to the bottom of the hopper, and then to clean the entire device.

The device which has just been described makes it possible, in a simple manner, to obtain an ore which has all the qualities permitting its use for producing finished products. During their travel in the device, the blocks of flesh undergo only slight stresses which have no unfavorable effect on the structure of the flesh or on the appearance of fines which generate an emulsion.

The device is industrially very advantageous since it makes it possible to process blocks of flesh continuously. In this respect, means may be provided for automatically feeding the hopper and conveying the parallelepipeds of meat produced towards a storage area.

The lengths of the parallelepipeds may be adapted to demand by adjusting the rotational speed of the screw (variation of the speed of movement inside the shaping device) or the rhythm of transverse cutting. On the other hand, as already described above, several sets of longitudinal cutting tools, whose interchangeability makes it possible to modify the width of these parallelepipeds, may be provided.

It should be noted that the transverse cutting means which, according to the invention, advantageously consist of a guillotine blade, could be replaced by other means, for example a mechanical device comprising a rotating cutting disk with planetary movement, a cutting apparatus with a laser beam of a pressurized jet of water.

Similarly, longitudinal cutting means other than those described could naturally be used, for example a series of rectilinear blades with alternating movement (passing through the slots of the shaping device), a cutting apparatus with a laser beam or a jet of water, etc.

Purely by way of indication, orders of magnitude of the possible values of certain characteristics relating to the structure or to the operating conditions of the device are given below.

capacity of the hopper 2:1 m$^3$;
use temperature: between $-5°$ C. and $+10°$ C.;
throughout: 4 tons of meat per hour;
diameter of thread of the Archimedes' screw 21: 300 mm;
speed of rotation of this screw: from 3 to 22 revolutions/minute;
speed of advance of the meats in the device: from 0.7 to 4.3 meters/minute;
section of entrance (8) of the shaping device 4: circular, of diameter 300 mm;
section of exit (s) of the shaping device 4: elongated rectangle, of width 400 mm and height 50 mm;
characteristics of the longitudinal cutting blades 59: number 9, mutual spacing: 40 mm, diameter 320 mm, thickness 3 mm, maximum speed of rotation: 780 revolutions/minute;
rate of transverse cut: between 4 and 210 cuts/minute.

Thus, the parallelepipeds of meat obtained will have, for example, a section of 50×40 mm, and a length of between 7 and 70 mm, this size depending on the speed of advance of the meats and the rate of the transverse cutting.

We claim:

1. An apparatus for continuously producing substantially parallelepipedal pieces of meat from blocks of meat having larger dimensions than said pieces of meat, said apparatus comprising an Archimedean screw unit for supplying said blocks of meat and, at an outlet of said screw unit, a shaping device comprising a first part in the form of a funnel having an entrance of substantially circular cross-section and an exit of rectangular cross-section and a second part consisting of an extrusion device of parallelepipedal form, said extrusion device having a cross-section substantially identical to that of said exit of said first part, said apparatus also comprising a plurality of longitudinal cutting members in said second part of said shaping device, each of said longitudinal cutting members being movably disposed through a respective pair of longitudinal slots in opposite faces of said second part, means for moving said longitudinal cutting members in order to cut an extruding meat block into a plurality of meat streams, transverse cutting members and means for moving said transverse cutting members in order to cut said meat streams into a plurality of parallelepipedal pieces of meat.

2. An apparatus according to claim 1, wherein said plurality of longitudinal cutting members consist of rotating disks, having bottoms engaging with a cylinder of counter-blades.

3. An apparatus according to claim 1, wherein said transverse cutting means are disposed at an exit of said extrusion device.

4. An apparatus according to claim 1, wherein said transverse cutting means are composed of a guillotine blade and means for reciprocating said guillotine blade.

5. An apparatus according to claim 1, wherein said first part of said shaping device is mounted so as to tilt, a dual-effect jack being fitted in order to pivot said first part of said shaping device upwards through an angle of approximately 90°, to permit removal of uncut blocks of meat.

* * * * *